United States Patent
Layton et al.

(10) Patent No.: US 6,754,816 B1
(45) Date of Patent: Jun. 22, 2004

(54) SCALABLE ENVIRONMENTAL DATA CALCULATION METHOD CUSTOMIZED BY SYSTEM CONFIGURATION

(75) Inventors: Jeffrey S. Layton, Round Rock, TX (US); Shawn J. Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 616 days.

(21) Appl. No.: 09/697,102

(22) Filed: Oct. 26, 2000

(51) Int. Cl.[7] .............................................. G06F 9/06
(52) U.S. Cl. ....................................................... 713/1
(58) Field of Search ........................ 713/1, 300; 710/8; 709/220

(56) References Cited

U.S. PATENT DOCUMENTS

| | | | |
|---|---|---|---|
| 5,307,260 A | | 4/1994 | Watanabe et al. ............ 364/401 |
| 5,483,656 A | * | 1/1996 | Oprescu et al. .............. 713/320 |
| 5,596,513 A | | 1/1997 | Schricker ..................... 364/557 |
| 5,787,246 A | * | 7/1998 | Lichtman et al. ............ 709/220 |
| 5,920,849 A | | 7/1999 | Broughton et al. .......... 705/400 |
| 6,086,618 A | | 7/2000 | Al-Hilali et al. ................ 703/2 |
| 6,487,608 B2 | * | 11/2002 | Gifford, Jr. et al. ............. 710/8 |

FOREIGN PATENT DOCUMENTS

JP          05040637 A  *  2/1993  ............ G06F/9/445

OTHER PUBLICATIONS

Longton, Andy, Re: What's FireWire?, Mar. 12, 1994.*
U.S. Pending patent application Ser. No. 09/318,108 entitled "Method and System for Adaptive Component Placement" by David Michael Raves; Dell USA, L.P. (DC-01820), Filed May 24, 1999.

* cited by examiner

Primary Examiner—Thomas Lee
Assistant Examiner—Mark Connolly

(57) ABSTRACT

A computer system for estimating resource usage of components in a particular system configuration is disclosed. The computer system includes a processor and a computer readable medium. System requirements, each of which describes an amount of an associated resource required by a particular system configuration, are stored within the computer readable medium. The processor receives component and configuration selections, retrieves an appropriate system requirement from the computer readable medium, and outputs that system requirement.

18 Claims, 2 Drawing Sheets

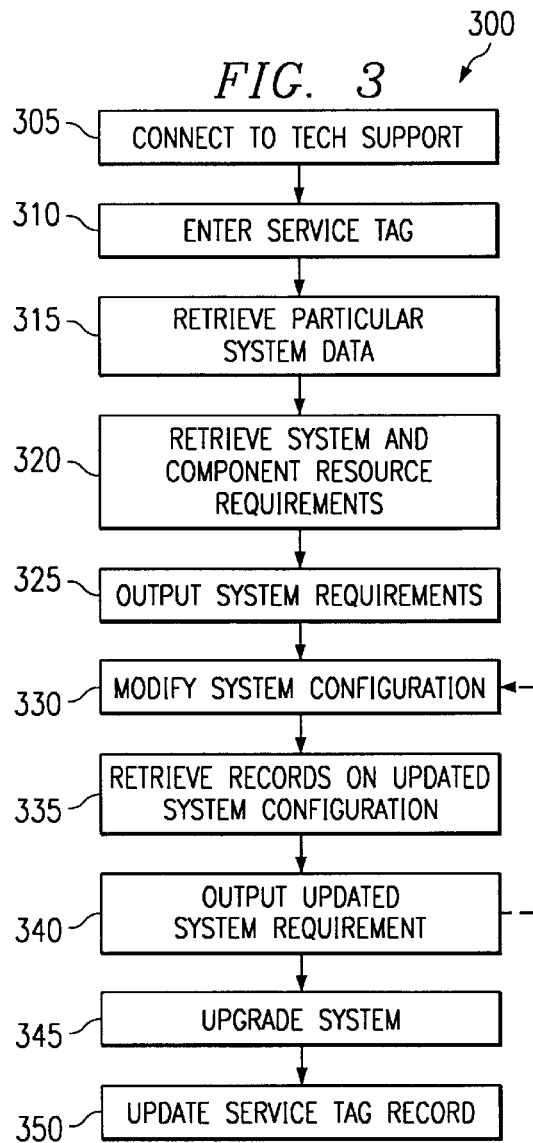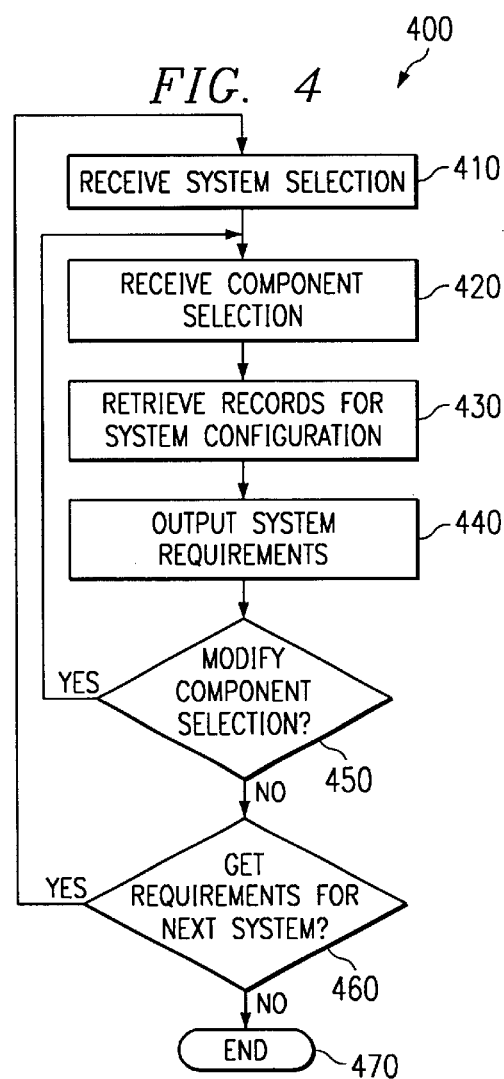

SCALABLE ENVIRONMENTAL DATA CALCULATION METHOD CUSTOMIZED BY SYSTEM CONFIGURATION

TECHNICAL FIELD

The present invention relates to computer systems and, more particularly, to a method and system for estimating resource usage associated with a computer system.

BACKGROUND

Computer systems require various associated resources. For example, a computer system requires uninterrupted power to function reliably as well as air conditioning or other cooling systems to prevent the system from overheating. The amount of a given associated resource required to operate a system depends on the number and type of components in the system and the arrangement of those components. When designing the configuration of the computer system or a data center containing several computer systems, it is desirable to know in advance how much of each associated resource a computer system will require.

Information on the amount of resources that a particular system will consume is available, but such information often consists of system-level estimates for resource consumption and resource requirements that assume a particular selection of components operating at a maximum anticipated resource consumption for the system. In many systems, however, the components within the system, and their anticipated resource consumption may vary significantly. Accordingly, the estimates provided for resource requirements are often inaccurate. This inaccuracy is often an over-estimation of required resources because the components chosen to estimate system resource requirements often include a maximum number of components that have the relatively high resource requirements.

To correct for this over estimation, users often discount the resource requirement estimate, for example, by some fixed percentage. Discounting the resource requirement estimate in this manner can often be arbitrary. This may result in a data center or other facility housing a system or multiple systems that has a resource capacity that is either inadequate or unnecessarily large. The former problem presents a significant risk that the system or component may not be able to function properly. When a facility has more resources than are necessary, the valuable resources of the user are wasted.

SUMMARY

Therefore, a need has arisen for a method of accurately estimating the amount of an associated resource required for a computer system and its components. In accordance with teachings of the present disclosure, a system and method are described for estimating resource usage for components in a particular system configuration. The system and method permit a user to access customized resource usage data for a system with a selected configuration of components.

In one aspect, a computer system for estimating resource usage of components in a particular system configuration is disclosed. The computer system includes a processor and a computer readable medium. System requirements, each of which describes an amount of an associated resource required by a particular system or component, are stored within the computer readable medium. The processor preferably receives a system configuration including a selected system and components, retrieves an appropriate system requirement associated with the system configuration from the computer readable medium, and outputs that system requirement. More specifically, the particular selection of a system configuration may be associated with a unique identifier, allowing easy retrieval of information about the system configuration.

A computer implemented method for estimating resource usage by a selected system configuration is also disclosed. The method includes selecting a system configuration including a system and at least one computer component. A system requirement, which describes the amount of an associated resource a computer system in the selected system configuration will require, is preferably retrieved from a computer readable medium. The system requirement is then outputted. The method can also extend to selecting additional components and updating previously selected system configurations.

The present disclosure presents a number of technical advantages over existing systems and methods for estimating computer system resource requirements. One technical advantage of the method and system disclosed herein is that the method and system may be readily used to assist data center design, component selection and purchase, and system upgrades. Another technical advantage is that the method and system may include a unique identifier to facilitate technical support and modifications to the system configurations. Other technical advantages will be readily apparent to one skilled in the art from the following detailed description and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a flow chart of a method for estimating resource usage incorporating communicating with a technical support web site in accordance with the present disclosure; and FIG. 4 is a flow chart depicting a method for estimating resource usage incorporating accessing a computer readable medium in accordance with the present disclosure.

DETAILED DESCRIPTION

Preferred embodiments and their advantages are best understood by reference to FIGS. 1 through 4, wherein like numbers are used to indicate like and corresponding parts.

Figure 1:
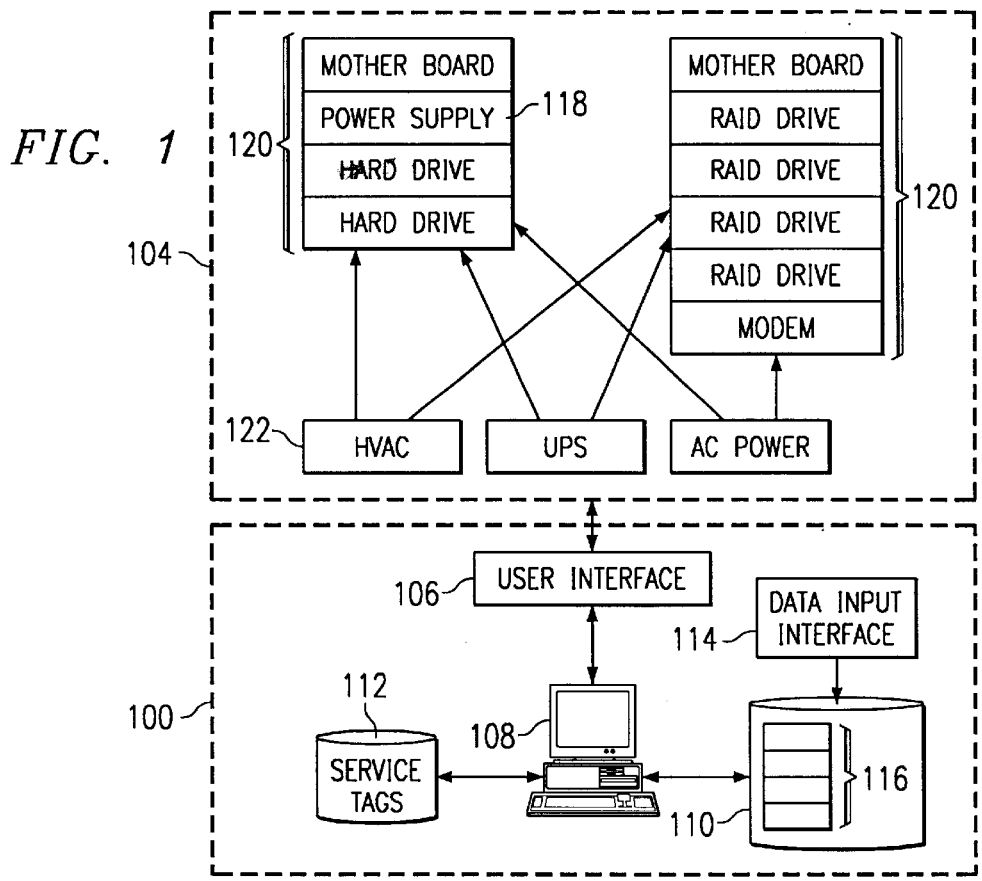
FIG. 1 is a depiction of a computer system for assisting in the design of a data center in accordance with the present disclosure.

Now referring to FIG. 1, a diagram of computer system 100 for estimating data center 104 resource requirements in accordance with the present invention is shown. Computer system 100 includes user interface 106, processor 108, component data memory 110, service tag memory 112 and data input interface 114. User interface 106 allows access to computer system 100. User interface 106 may be, for example, a web page, a user terminal, a network server or any other suitable interface allowing information to be sent to and received from processor 108. Processor 108 may incorporate Unix, Linux, Windows (any type or version) or any other operating system suitable to receive messages through user interface 106 and to access the component data memory 110.

Processor 108 may selectively access component data memory 110. Component data memory 110 preferably stores various records 116 which may preferably be entered into component data memory 110 via data input interface 114. Data input interface 114 may be an operator terminal, work station, a web page, a keyboard or another suitable interface for data entry.

Records 116 are preferably collections of data concerning computer components and computer systems and their respective resource requirements. Records 116 preferably describe the component resource requirements for a plurality of computer systems and computer components. The resource requirements stored in records 116 may include, for example, the maximum and average estimated resource requirement for a plurality of particular computer systems and computer components. The resource requirements stored in records 116 may also include maximum and average estimated resource requirements for particular system configurations. Each record 116 preferably relates a particular system or component to the amount of an associated resource that the particular system or component requires to function reliably. For example, a record 116 might describe the amount of cooling in BTU/hr (or equivalent units) required to keep a system or components within a desired temperature range under normal operating conditions, thus indicating how much Heating, Ventilation, and Air Conditioning (HVAC) would be required for a particular system or component. Alternatively, records 116 might describe how much AC power, expressed in kW/hr, kVA, or Amperes (at a given voltage), that a system or component requires. Record 116 may similarly describe the amount of uninterrupted power supply (UPS) a system or component would require should the AC power be interrupted. These kinds of records 116 are only examples and should not be construed to limit the types of records 116 and associated resources suggested by the disclosure.

Records 116 are preferably organized both by individual component and system. Alternatively, records 116 may be organized by particular system configurations for systems with pre-selected components. In a preferred embodiment, records 116 of resource requirements for systems and components may be gathered through empirical observation and testing, then entered into component data memory 110 by means of data input interface 114. A technical advantage of this embodiment is that the resource requirements reflect the requirements of each system with selected components under operating conditions.

Service tag memory 112 facilitates the access and retrieval of records 116. A service tag is preferably a unique identifier of a particular system configuration. Service tags may operate to identify and retain information related to a particular system or component. The service tag memory 112 retains information about particular systems including system components, system requirements and user or purchaser information where appropriate. This information may also be associated with a client serial number or another unique identifier allowing easy identification of a particular system.

When an existing system configuration is to be modified, processor 108 may retrieve information related to the existing system configuration from service tag memory 112, removing the need for a user to re-enter the system configuration of an existing system. A user may then input changes to the system to obtain system resource requirements for a modified system configuration. Changes to the system configuration may then be incorporated within service tag memory 112. The use of service tag memory 112 may significantly decrease the amount of time spent on data entry as well as reducing the possibility of user error in entering system components.

FIG. 1 also depicts data center 104 or alternatively, a design for data center 104. Data center 104 may include any facility having one or more computer system 118, such as servers, with various component configurations, hereinafter referred to as "data center subsystems" 118. Data center 104 may further include one or more network components such as routers, switches, network hubs, network interface,cards (NIC) and other suitable data center components. Data center subsystems 118 include systems configured with one or more components 120. Data center 104 also preferably includes associated resources 122 necessary for data center subsystems 118 to function properly.

As shown in FIG. 1, system components 120 may include motherboards, power supplies, monitors, hard drives, RAID (Redundant Array of Inexpensive Drives) drives, CD-ROM drives, disk drives, ZIP drives, modems, or any other computer component. Associated resources 122 may include AC power, uninterrupted power supply (UPS), and Heating, Ventilation, and Air Conditioning (HVAC) subsystems 118. For increased efficiency, associated resources 122 are preferably allocated for data center 104 as a whole rather than for each data center subsystem 118.

In operation, computer system 100 may be used to assist in the design of data center 104 or to estimate the resources required to operate one or more data center subsystems 118. In one embodiment, data center subsystems 118 with components 120 are selected for data center 104. Processor 108 retrieves one or more records 116 associated with each data center subsystem 118 and outputs the respective information from records 116 to user interface 106. This information may then be used to estimate the amount of each associated resource 122 that data center 104 will require. For example, the information might be used to determine the size or number of HVAC units in data center 104 or to design a wiring system for data center 104 with sufficient power capacity to support data center subsystem 118 with components 120.

In an alternative embodiment, components 120 may be interactively selected with computer system 100. The information from the computer system 100 may also be used to assist in selection of components 120. For example, the information may be used to minimize the cost for data center 104. A certain component 120 might cost less than another similar component 120 but give off more heat than the similar component 120. Using the information from computer system 100, it may be determined that the cheaper component 120 would actually cost more to operate in a particular data center. Thus, the selection of components 120 may be adapted to minimize the overall cost of data center 104 by using more energy-efficient components 120.

Figure 2:
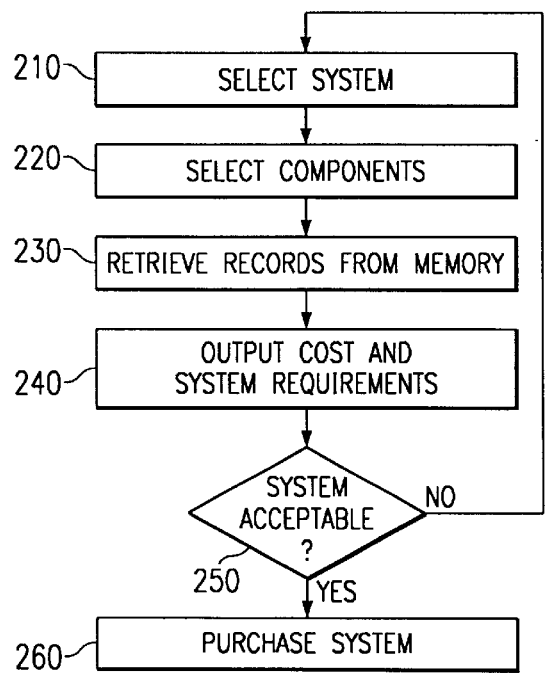
FIG. 2 is a flow chart illustrating an interactive component purchase using the method for estimating resource usage in accordance with the present disclosure.

Embodiments in the present disclosure may be used in all stages of data center 104 operation, including initial design and purchase, upgrading the data center, maintenance and reconfiguration of existing components. FIGS. 2–4 illustrate how preferred embodiments of the present disclosure may be used in these situations.

FIG. 2 illustrates a sample purchase 200 of computer components with the assistance of a preferred embodiment of the present disclosure using computer system 100. The purchase is described with reference to the features shown previously in FIG. 1. In Step 210, a computer system 120 is preferably selected. In Step 220, components for the computer system are preferably selected. Step 230 includes retrieving records 116 related to the system configuration, including the selected system and components, from component data memory 110. Next, in Step 240, computer system 100 outputs a cost and one or more system requirements describing the amount of an associated resource 122 components 120 will require to operate in the selected system configuration.

In Step 250, a decision is made on whether the system configuration is acceptable based on the cost and system requirements or other factors. The determination can be based upon cost of components plus associated resources, energy efficiency or any other suitable condition. One technical advantage of this use of the present embodiment is that a determination of system configuration acceptability, may properly consider system configuration, properly accounting for the resource requirements of various selected system components. Should the system configuration be unacceptable, the process may return to Step 210, and a new system configuration may be selected in Steps 220 and 230. If the selected system configuration is deemed acceptable at Step 250, the selected system configuration may be purchased in Step 260.

FIG. 3 is a flow chart 300 showing the use of a preferred embodiment of the disclosure that incorporates the use of service tags to facilitate a system upgrade. In Step 305, a connection is made to a technical support system that preferably includes a computer system such as computer system 100 depicted in FIG. 1. In Step 310, a service tag number associated with the system that is being upgraded is entered. In Step 315, the system and components associated with the particular service tag are retrieved.

After the current system configuration has been retrieved, processor 108 preferably retrieves the resource requirements of the current system configuration in Step 320. In a preferred embodiment, this includes combining the resource requirement for the system and each component within the system configuration. Step 325 includes outputting the resource requirements associated with the current system. A technical advantage of this embodiment is that a user need not re-enter the current system configuration but instead accesses stored information of previously purchased systems by entering a service tag number 310.

Once a previous system configuration is retrieved, in Step 330, the system configuration may be modified and any new components added. In Step 335, computer system 100 retrieves the component information for the modified system configuration. In Step 340, computer system 100 outputs system requirements for the system as modified, preferably accompanied by the cost for any new components. A decision may be made to make further modifications, thus returning the process to Step 330. If the updated system is accepted, the system is preferably upgraded in Step 345. That is, the newly selected components are purchased and installed within the system. In a preferred embodiment, the information about the new system, received at Step 340, may be compared to the information about the old system, received at Step 325, thus facilitating evaluation of the upgrade.

In Step 345, a choice may be made whether to implement the updated system configuration and whether to order any of the new components required. In Step 350, the information in service tag memory 112 is updated to reflect the modifications to the system configuration. The new service tag information is then accessible in the future should the system require additional modification.

FIG. 4 illustrates an embodiment of the present disclosure in the form of a computer readable medium such as a CD-ROM and a flow chart showing how the computer readable medium can be used to assist with configuring a system. The computer readable medium preferably contains instructions for causing processor 108 to perform the steps outlined in FIG. 4. It is understood that any computer readable medium (e.g., floppy disk, hard drive, carrier wave, etc., etc.) could be substituted in the present embodiment. In a preferred embodiment, the computer readable medium contains information relating particular systems and components to respective amounts of associated resources that the systems and components require, similar to records 116 within component data memory 110 of FIG. 1. Preferably, the computer readable medium may also contains other information to assist in system configuration, such as information to assist in racking components within a computer rack. Such a preferred embodiment has the technical advantage of reducing the amount of time and effort that must be expended in designing system configurations.

In Step 410, processor 108 receives a system selection. In Step 420, processor 108 receives a selection of components 120; then, in Step 430, processor 108 retrieves information concerning the selected system and components. Preferably, this information may be retrieved from the computer readable medium but alternatively it may be received from a component data storage memory such as component data memory 110 shown in FIG. 1. Processor 108 preferably outputs one or more system requirements for the selected system and components in Step 440. Preferably, this information is outputted along with any other stored information that might relate to the system configuration. Step 450 includes repeating the method for as many system configurations as may be required.

Although the disclosed embodiments have been described in detail, it should be understood that various changes, substitutions and alterations can be made to the embodiments without departing from their spirit and scope.

What is claimed is:

1. A computer system, comprising:
   a computer readable medium;
   a plurality of system requirements stored within the computer readable medium, the system requirements representing an amount of an associated resource required for the system to operate reliably, wherein the associated resource is selected from the group consisting of: high volume air conditioning (HVAC), uninterrupted power supply (UPS), and AC power;
   a plurality of component requirements stored within the computer readable medium, each component requirement representing an amount of an associated resource required for the at least one component to operate reliably within the system; and
   at least one processor operable to:
      receive a selected system configuration for a selected system having at least one selected component;
      retrieve from the computer readable medium a particular system requirement associated with the selected system configuration; and
      output the particular system requirement.
2. The computer system of claim 1, further comprising a unique identifier associated with the selected system configuration.

3. The computer system of claim 1, wherein the at least one processor is further operable to:
   receive a first selection of an additional component;
   update the selected system configuration to include the additional component;
   retrieve from memory an updated system requirement associated with the updated selected system configuration; and
   output the updated selected system requirement.

4. The computer system of claim 1, further comprising a web page operable to:
   receive the selected system configuration;
   communicate the selected system configuration to the at least one processor; and
   output the selected system requirement.

5. The computer system of claim 1, further comprising a network server operable to:
   receive the selected system configuration;
   communicate the selected system configuration to the at least one processor; and
   output the particular system requirement.

6. The computer system of claim 1, further comprising the particular system requirement selected from the group consisting of: a required amount of cooling expressed in BTU/hr, a required amount of power expressed in kW/hr, a required amount of power expressed in kVA, and a required amount of AC power expressed in Amps at a given voltage.

7. The computer system of claim 1, further comprising:
   a service tag module;
   a service tag memory;
   a system configuration storage within the service tag memory; and
   the service tag module operable to retrieve system configuration information for selected system configuration from the service tag memory and to communicate the system configuration information to the processor.

8. A computer implemented method for estimating an amount of an associated resource required for a computer system, comprising:
   selecting a system configuration including a computer system and at least one component for a computer system;
   retrieving from memory a system requirement associated with the system configuration, the system requirement representing an estimated amount of the associated resource required for the system configuration to function reliably, wherein the associated resource is selected from the group consisting of: high volume air conditioning (HVAC), uninterrupted power supply (UPS), and AC power; and
   outputting the system requirement.

9. The computer implemented method of claim 8, wherein the system requirement is selected from a group consisting of: required amount of cooling expressed in BTU/hr, required amount of power expressed in kW/hr, required amount of power expressed in kVA, or required amount of power expressed in Amperes at a given voltage.

10. The computer implemented method of claim 8, wherein at least one of the components is selected from the group consisting of: a motherboard, a power supply, and a storage unit.

11. The computer implemented method of claim 8, further comprising:
   selecting at least one additional component;
   selecting an updated system configuration including the at least one component and at least one additional component;
   retrieving from memory an updated system requirement associated with the updated system configuration; and
   outputting the updated system requirement.

12. The computer implemented method of claim 8, further comprising selecting a system configuration including a computer system and a plurality of components for the computer.

13. The computer implemented method of claim 8, further comprising selecting data center resources using the system requirement.

14. The computer implemented method of claim 8, further comprising selecting a unique identifier associated with a system configuration.

15. The computer implemented method of claim 8, further comprising outputting the system requirement to a web page.

16. A computer readable medium comprising:
   a plurality of system requirements stored on the computer readable medium, each system requirement associated with a respective system configuration for a system and at least one component and representing an amount of an associated resource required for the system configuration to operate reliably, wherein the associated resource is selected from the group consisting of: high volume air conditioning (HVAC), uninterrupted power supply (UPS), and AC power; and
   a plurality of instructions stored on the computer readable medium, the plurality of instructions configured to cause a processor to:
      receive a selected system configuration for at least one selected component;
      retrieve a particular system requirement associated with the selected system configuration from the computer readable medium; and
      output the particular system requirement.

17. The computer readable medium of claim 16, further comprising a CD-ROM.

18. The computer readable medium of claim 16, further comprising the system requirement selected from a group consisting of: a required amount of cooling expressed in BTU/hr, a required amount of power expressed in kW/hr, a required amount of power expressed in kVA, and a required amount of AC power expressed in Amps at a given voltage.

* * * * *

UNITED STATES PATENT AND TRADEMARK OFFICE
CERTIFICATE OF CORRECTION

PATENT NO. : 6,754,816 B1
DATED : June 22, 2004
INVENTOR(S) : Layton et al.

It is certified that error appears in the above-identified patent and that said Letters Patent is hereby corrected as shown below:

Title page,
Item [54], Title, please correct to read -- SYSTEM AND METHOD FOR DETERMINING ASSOCIATED RESOURCES REQUIRED FOR A COMPUTER SYSTEM --

Signed and Sealed this

Seventeenth Day of August, 2004

JON W. DUDAS
*Acting Director of the United States Patent and Trademark Office*